United States Patent

[11] 3,629,853

[72] Inventor John D. Newton
Kingston, N.Y.
[21] Appl. No. 823,988
[22] Filed June 30, 1959
[45] Patented Dec. 21, 1971
[73] Assignee International Business Machines Corporation
New York, N.Y.

[54] DATA-PROCESSING ELEMENT
34 Claims, 5 Drawing Figs.

[52] U.S. Cl. .......... 340/172.5
[51] Int. Cl. .......... G06f 9/10
[50] Field of Search .......... 340/172.5

[56] References Cited

UNITED STATES PATENTS

| | | | |
|---|---|---|---|
| 2,799,449 | 7/1957 | Turing et al. | 340/172.5 |
| 2,891,723 | 6/1959 | Newman et al. | 340/172.5 |
| 2,925,588 | 2/1960 | Sublette et al. | 340/172.5 |
| 2,959,351 | 11/1960 | Hamilton et al. | 340/172.5 X |
| 3,018,956 | 1/1962 | Hosier et al. | 340/172.5 X |
| 3,048,332 | 8/1962 | Brooks et al. | 340/172.5 |
| 3,143,644 | 8/1964 | Selmer | 340/172.5 X |

*Primary Examiner*—Gareth D. Shaw
*Assistant Examiner*—Paul R. Woods
*Attorney*—Edgar H. Kent

ABSTRACT: A digital computer system having multiple memory units for storing information words representative of data and instructions, control means including means for extracting information words from the memory units, and two instruction registers. A first instruction register stores an instruction while first steps in the manipulation thereof are performed and a second instruction register stores the instruction while second steps in the manipulation thereof are performed. The computer further includes means for transferring an instruction from the first instruction register to the second instruction register and means for transferring a further instruction to the first instruction register for effecting the concurrent processing of two instructions. Both data and instruction words may be extracted from different memory units at the same time. Control logic provides signals indicative of memory accessibility. The computer is also adapted to conditionally proceed with the processing of an instruction sequence in accordance with the probability of the occurrence of a condition prior to the ascertainment of that condition and to inhibit the instruction sequence and initiate the processing of another instruction sequence if the condition occurs.

INVENTOR.
JOHN D. NEWTON
BY Edgar H. Kent
ATTORNEY

DATA-PROCESSING ELEMENT

This invention relates generally to electronic digital data-processing systems and is more particularly concerned with improved logical organization of computing machines of the stored-program type.

In many types of digital data-processing equipments now generally available, and particularly in the complex general purpose computers which operate in the binary mode, the progress of the data processing is determined by a program of instructions which are sequentially processed by the computer element. Certain instructions typically enable flexible control of the program sequence while other instructions obtain data words from storage and specify operations to be performed on those data words. In a computer designed for parallel operation in the binary mode, each instruction word includes a plurality of binary digits, certain of which are denominated the operation part of the instruction and others the address part of the instruction. The instruction words are stored in memory in one or more program arrangements or sequences, and these programs are in many cases arranged for processing in loop fashion so that the same instructions may be performed over and over again in the same sequence with variations in the operands upon which the instructions operate. Heretofore, so far as is known, only one instruction could be processed during any given time interval due to the logical organization and the types of components used in these types of computers. The logical organization of the computer determines, to a not insubstantial degree, the types of problems that can readily be handled by the equipment and the maximum speed of the data-processing operation. With the increasing magnitude and complexity of data-handling problems, the need for improved logical organization of digital computers and similar data-processing apparatus which enables higher speed, greater flexibility, and increased reliability is a problem of immediate significance and is accorded a certain degree of urgency by many of the personnel working in this art.

Accordingly, an object of the invention is to provide an improved processing organization adapted for association with a computer designed to operate in the binary mode and which provides higher speed and more flexible operation than comparable apparatus previously available.

Another object of the invention is to provide a data-processing machine capable of concurrently processing more than one instruction.

Still another object of the invention is to provide a computer organization which is adapted to conditionally initiate the processing of an instruction sequence in accordance with the probability of occurrence of a determining condition prior to the ascertainment of that condition.

A further object of the invention is to provide a data-processing machine capable of normally concurrently processing a plurality of instructions, means for automatically maintaining the data-processing operation when an ambiguity exists between information selection signals in a manner such that the data processing continues at a high rate of speed.

The computing apparatus designed in accordance with the invention is organized to utilize a plurality of instruction-decoding elements in a manner that enables more than one instruction to be concurrently processed. This organization is under the general supervision of a program control element and generally follows conventional computer construction principles. In a preferred embodiment, an instruction specified by the program is read from memory and decoded at one level to determine the type of instruction. If this instruction is of the operand-handling type, for example, the next instruction is withdrawn from one memory simultaneously with the withdrawal of the specified operand from another memory. During this concurrent processing, or overlap operation, while one instruction is being obtained from memory the other instruction may be performing an arithmetic operation. Thus two instructions may be concurrently processed and both data and instruction words may be extracted from different memory units at the same time. This logic enables a significant increase in overall machine-operating speed.

In certain cases, where an instruction and the data operand specified by the previous instruction require the same access device, for example, an ambiguity in the information extraction process may arise and, therefore, only one type of stored information may be withdrawn. In such case, the organization of the preferred embodiment is arranged to automatically accord a preference to the data word over the instruction word so that expeditious completion of the previously initiated instruction is ensured.

In addition, an improved program control technique is incorporated in the organization of the preferred embodiment. In the processing of certain types of data, it is frequently desirable to control the subsequent instruction program in accordance with the results of certain arithmetic operations. An example of such an operation is the comparison utilized in a table look-up or other similar type of data search operations. Under those conditions, the computer utilizes its arithmetic element to search for data which satisfies a specified criterion and upon discovery of such a piece of data, modifies the subsequent program operation appropriately. An example of this operation is in the branching technique when, as a result of a satisfactory comparison, the computer executes a branch of control to start a new instruction sequence. Thus the computer will next process one of two possible instructions dependent upon the results of the comparison. The computer of the preferred embodiment is organized to enable the initiation of the more probable of the two courses of action before the results of the comparison are established, and the assumption is made that an unsuccessful comparison will be made most of the time when in a data search operation. When each actual result is determined, the instruction is allowed to progress or is inhibited accordingly. This arrangement enables a substantial increase in effective data processing speed in table look-up operations, for example.

Other objects and advantages of the invention will be seen as the following description of a preferred embodiment thereof progresses in conjunction with the drawings, in which.

Figure 1:
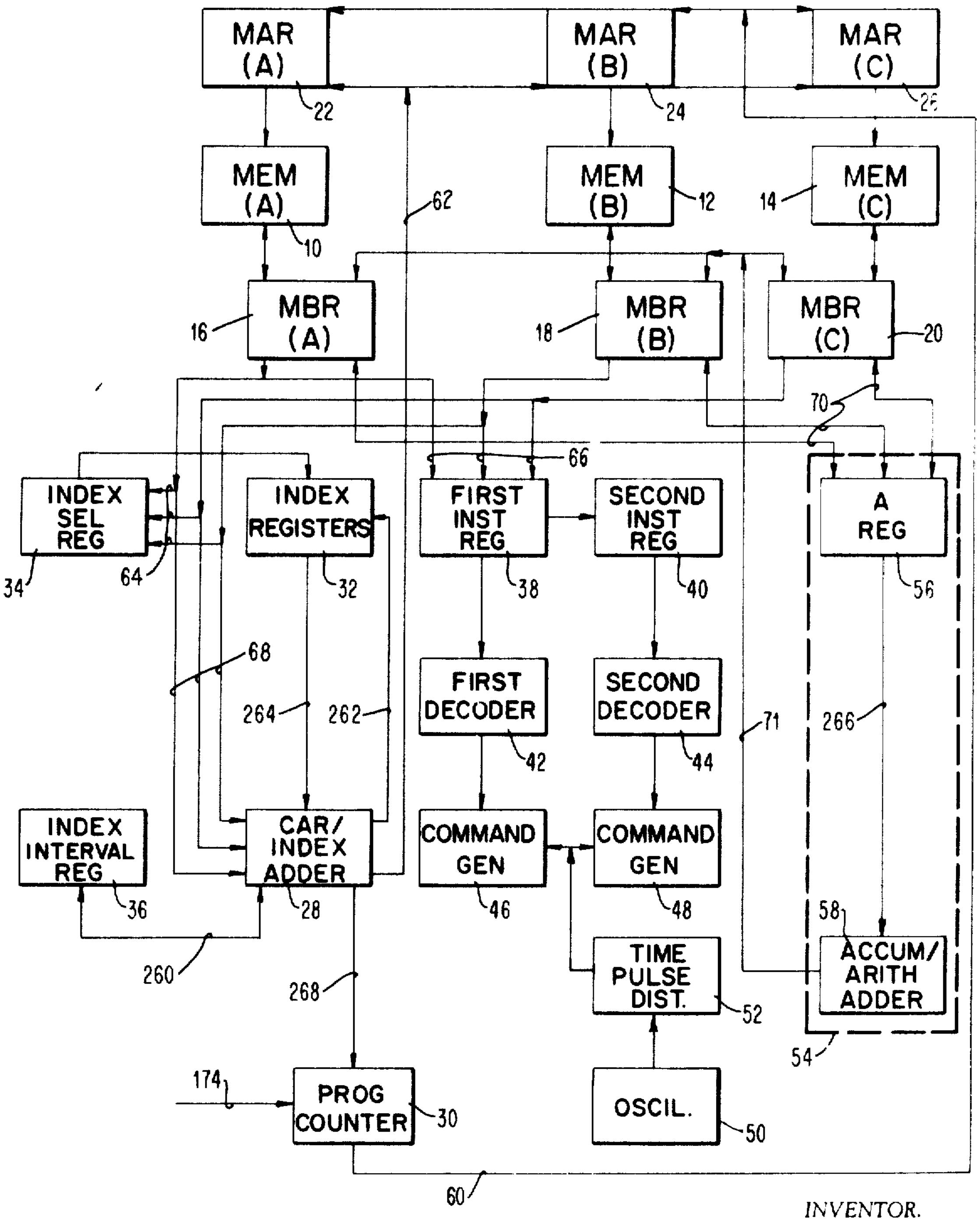
FIG. 1 is a block diagram of a digital computer system according to a preferred embodiment of the invention.

Throughout the following description and in the accompanying drawings there are certain conventions employed which are familiar to certain of those skilled in the art. Additional information concerning those conventions is as follows:

In the block diagram figures of the drawing a conventional filled-in arrowhead is employed on lines throughout the drawing to indicate (1) a circuit connection, (2) energization with a pulse, and (3) the direction of pulse travel which is also the direction of control. A diamond-shaped arrowhead indicates (1) a circuit connection and (2) energization with a DC level.

Boldface character symbols appearing within a block symbol identify the common name for the circuit represented, that is, FF identifies a flip-flop, G a gate circuit, A a logical AND circuit, OR a logical OR circuit, and so forth. A variety of circuits for the performance of each of these functions is known in the art.

Certain elements of the computer according to a preferred embodiment and information transfer paths between those elements are shown in FIG. 1.

This data-processing machine incorporates multiple memories, two-level decoding, and overlapped or concurrent instruction processing. These logical features enable a much higher rate of data processing than has been available in comparable prior computers. As shown in FIG. 1, the computer system includes three memories (MEM) 10, 12, and 14, each having associated therewith a memory buffer register (MBR)

16, 18, and 20 respectively, and a memory address register (MAR) 22, 24, and 26 respectively. Information transfer from these memories is controlled by a program control element in the control section of the computer which utilizes information provided by a central address register (CAR) 28 and a program counter (PCTR) 30. The contents of the program counter normally specify the address of the next instruction word and the contents of the central address register may specify either the address of the next data word operand to be processed or the address of the next instruction. Associated with the central address register 28 is indexing circuitry which includes three index registers 32, an index selection register 34 and an index interval register 36. This indexing circuitry enables a modification of the address portion of an indexable instruction word to be accomplished in accordance with the contents of specified registers.

Figure 2:
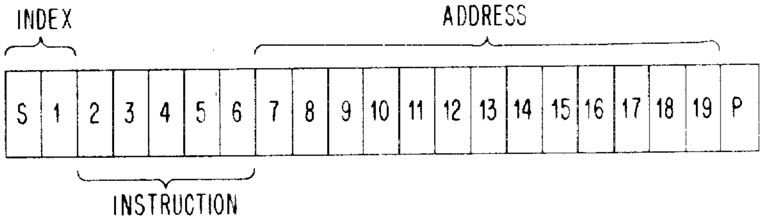
FIG. 2 is a diagram of the instruction word utilized in the computer system of FIG. 1.

The instruction word utilized in this computer contains 20 information bit positions plus a parity bit. The diagrammatic form of the elements of the word is indicated in FIG. 2. Bits S and 1 specify an index register. Bits 2 through 6 indicate the specific instruction and thus enable the use of 32 distinct instructions. Bits 7 and 8 identify a memory unit and bits 9–19 define the address in the specified memory unit of the information word next desired. Memory 10 is specified if the value of bit 7 is binary Zero, memory 12 if bit 7 is One and bit 8 is Zero and memory 17 if both bits 7 and 8 are One.

Two instruction registers 38 and 40 are provided and the first instruction register ($IR_1$) 38 normally receives from memory those bits (2–6) which determine instruction type and perform indexing. These bits are transferred to the second register ($IR_2$) 40 to carry out the basic operation for each instruction. Associated with each instruction register is a decoder 42, 44 respectively and a command generator 46, 48 respectively. Commands as specified by each instruction are generated in the usual manner for effecting the processing of the data or other computer operation as a result of pulses which are produced by oscillator 50 and time pulse distributor 52.

The arithmetic element 54, which may include a variety of elements, is, in this instance, shown in simplified form as including an A-register 56 and an accumulator adder 58. Arithmetic operations on the data words are performed in the arithmetic element in accordance with the commands generated as specified by the associated instruction word.

If additional information concerning this general type of computer arrangement or suitable constructions of certain of the elements is believed desirable or necessary, reference may be had to the copending application Ser. No. 570,199 titled "Electronic Data Processing Machine" filed in the name of Harold D. Ross et al. on Mar. 7, 1956 issued as U.S. Pat. No. 2,914,248 on Nov. 24, 1959.

In the described embodiment, the memory cycle is 1.6 microseconds in duration and the subsequent timing analyses will refer to that basic cycle. Each memory cycle is divided into 10 time pulse periods (TP 0–TP 9). During the first half of each memory cycle, (beginning at TP 0), the address is sent to memory, memory operation is initiated, and the word read from the specified address to the associated memory buffer register. The address of a desired instruction word is transferred to a memory address register from the program counter over lines 60 and the address of a desired word is transferred from the central address register 28 over lines 62.

In general at time TP 5, the word read from memory is transferred to certain registers either in the program and instruction control or in the arithmetic element.

Bits S and 1 of the instruction word from the address specified by the program counter 30 are transferred through the associated memory buffer register and over lines 64 to the index selection registers; bits 2–6 are transferred over lines 66 to the first instruction register 38 and bits 7–19 are transferred over lines 68 to the central address register 28. A data word is transferred over lines 70 to the A-register 56 in the arithmetic element.

Bits 2–6 of the instruction word are decoded in decoder 42 between TP 5 and TP 7 and subsequent timing pulses from TP 7 to TP 5 of the next cycle generate commands in accordance with levels provided to the command generator 46 as a result of the decoded instruction.

During the period, TP 7–9, the address portion of the instruction word, which was previously placed in the central address register, may be modified by the contents of a selected index register in a conventional indexing operation. At the next TP 0 time, a second memory cycle commences in which a data word whose address is specified by the contents of the central address register 28 over lines 62 (for a data-handling instruction) is read from one of the memories through the associated memory buffer register and over lines 70 to the A-register 56 or is transferred from the A-register 56 (lines 70) or the accumulator (lines 71) for storage in the addressed memory. The next instruction as specified by the program counter 30 is also read from a different memory commencing at the same TP 0 time, if overlap operation is not inhibited, and bits thereof are transferred to the index selection register 34, the central address register 28 and the first instruction register 38 at time TP 5 of that cycle, the bits previously stored in the first instruction register being transferred to the second instruction register 40 at that time so that any necessary subsequent commands associated with the first instruction may be generated. Thus two instructions may be processed simultaneously in overlap fashion by this computer organization.

Figure 3:
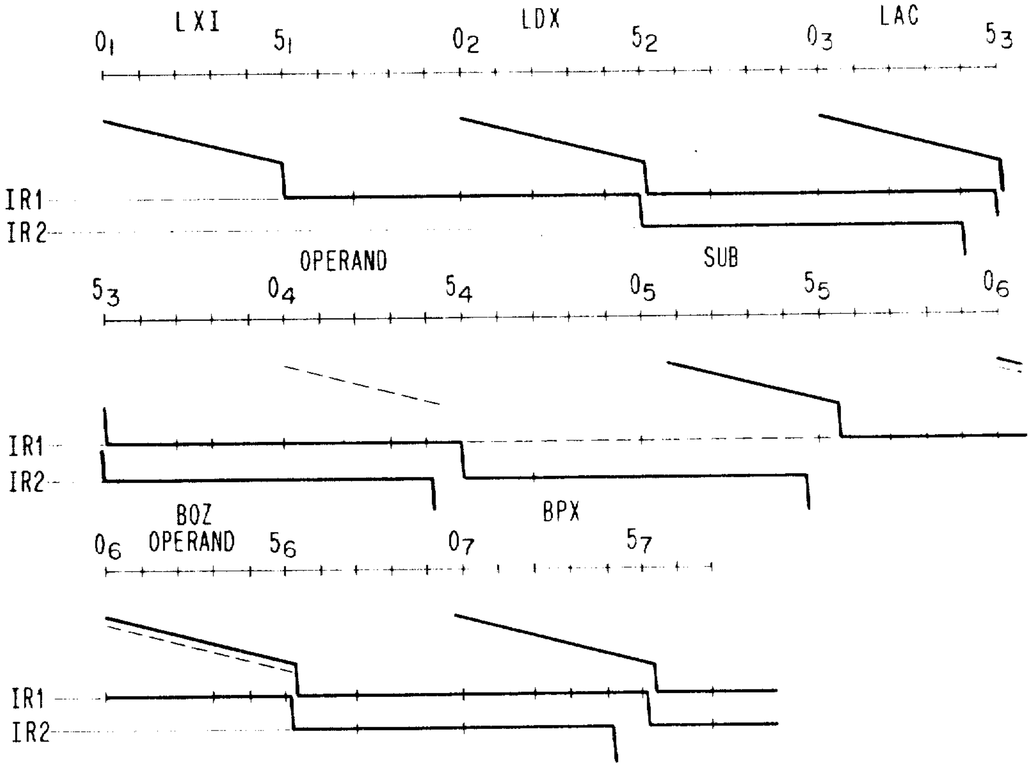
FIG. 3 is a timing diagram illustrative of a portion of a typical program and of the two-level instruction processing that is utilized in the computer system shown in FIG. 1.

The timing diagram shown in FIG. 3 indicates the timing of instruction and data readout and command generation for the execution of an illustrative program of six instructions (LXI, LDX, LAC, SUB, BOZ, and BPX) in accordance with principles of the invention. The execution of this illustrative program is described in detail hereinafter. In the timing diagram the 10 time pulses for each memory cycle are indicated on a horizontal time reference line, the TP 0 and TP 5 pulses for each cycle having reference numerals 0 and 5, respectively. Thus $0_1$ indicates TP 0 time for the first memory cycle, $0_2$ indicates TP 0 time for the second memory cycle, etc. Positioned beneath this time reference are two horizontal lines, the upper one being labeled IRI and the lower one being labeled IR2. The heavy portion on the upper horizontal line indicates the time during which an instruction is in the first instruction register 38 (IR1) and the heavy portion on the second line indicates the time that an instruction is in the second instruction register 40 (IR2). The times that certain commands are generated during each instruction are indicated by short vertical lines on the heavy portions. A heavy solid line extending diagonally downward to the right indicates the reading out of an instruction word from a memory to the associated memory buffer register and a dotted diagonal line indicates the reading out of a data word from a memory in similar manner. The vertical transition between a solid diagonal line and the first horizontal portion indicates the transfer of the instruction from a memory buffer register to the first instruction register and the vertical transition between the first and second portions indicates the transfer of the instruction from the first instruction register to the second instruction register. Thus it will be seen from FIG. 3 that the first instruction (LXI) is read from memory into a memory buffer register between the time $0_1$ and $5_1$. At time $5_1$ the instruction is transferred to the first instruction register and commands are generated during the time period $7_1$ to $4_2$. The LXI instruction is transferred to the second instruction register at $5_2$ time but no commands are generated from the second instruction register as the execution of the LXI instruction is completed in one machine cycle. The operand for the LAC instruction is read from a memory during the fourth memory cycle starting at $0_4$ time and the operand for the SUB instruction is read from a memory during the sixth memory cycle starting at $0_5$ time. It will be noted that the diagram indicates that the BOZ instruction is read from one memory at the same time that the operand of the SUB instruction is read from another memory.

Figure 4:
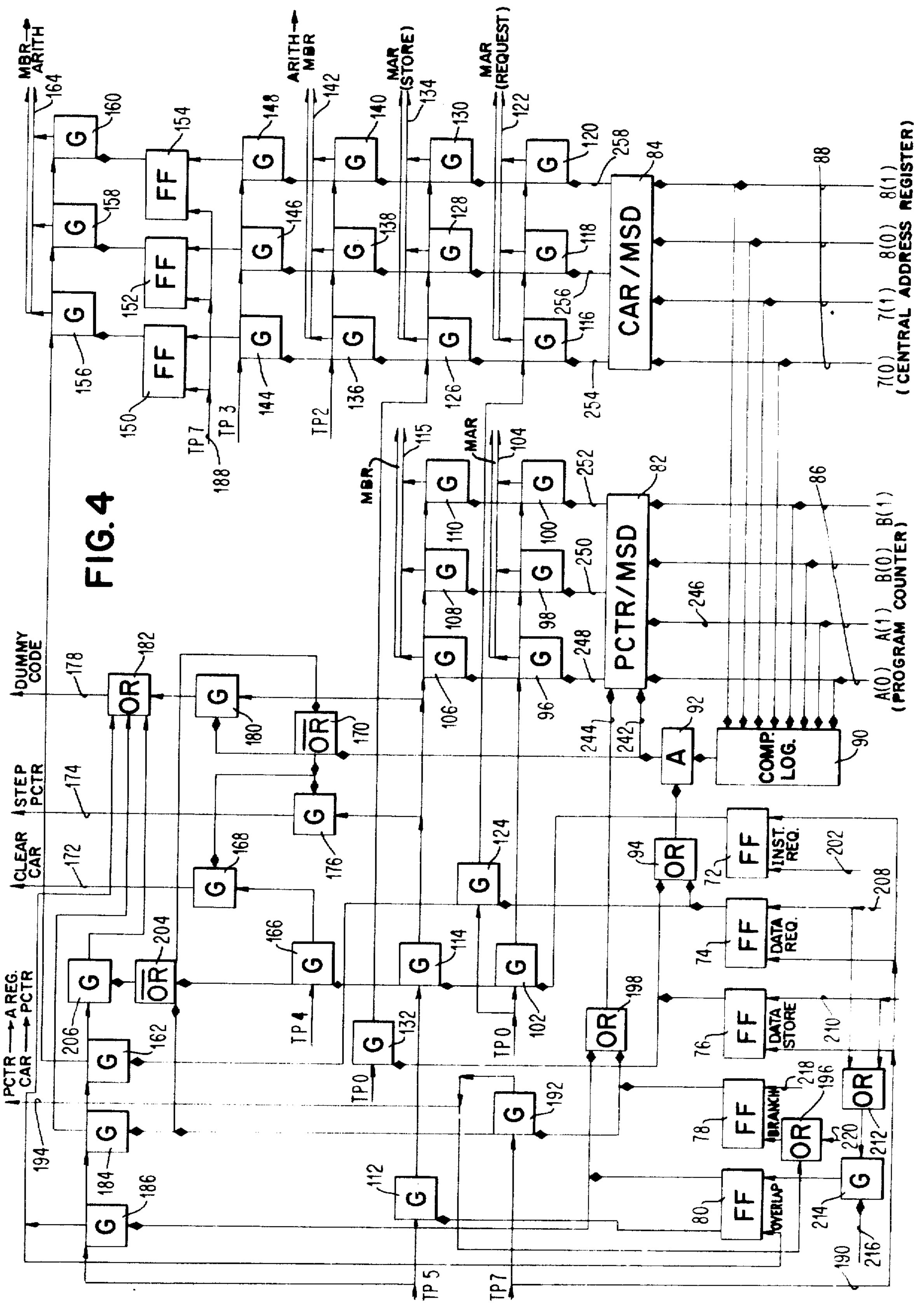
FIG. 4 is a logical block diagram of the data-processing program control element of the computer of FIG. 1.

The program control element which supervises this type of operation in the subject computer is shown in FIG. 4 in logical block form. In this element there are provided three cycle control flip-flops, the instruction request flip-flop 72, the data request flip-flop 74 and the data store flip-flop 76. There is also provided a branch control flip-flop 78 and an overlap control flip-flop 80. The output levels of the cycle control flip-flops are utilized to initially control the routine processing of each information word to be read from a memory. The instruction request flip-flop is set each cycle and remains set if a new instruction is desired. The data request flip-flop is set whenever data is desired and the data store flip-flop is set for a data store operation. Also provided in the program control element is a memory select decoder (PCTR/MSD) 82 which is associated with the program counter and a memory select decoder (CAR/MSD) 84 associated with the central address register. Decoder 82 is conditioned by input levels on lines 86 from bits A and B of the program counter which identify the memory specified by the contents of that counter and the decoder 84 is conditioned by levels on lines 88 which specify the memory selected by bits 7 and 8 of the central address register. The levels applied on lines 86, 88 are also applied to a compare logic circuitry 90. This circuitry may be a conventional arrangement of AND circuits and has an output if the memory specified by the contents of the program counter is the same as the memory specified by the contents of the central address register. The output of the compare logic 90 is applied to AND-circuit 92, the other input of which is conditioned if either the data request flip-flop or the data store flip-flop has a One output level (which is applied to AND-circuit 92 through OR-circuit 94). The output of the AND-circuit 92 is applied as an inhibit level to decoder 82 to remove any output level generated by that decoder.

Each decoder has an output on one of its three output lines in accordance with the memory selected by the associated apparatus. Associated with the outputs of decoder 82 are three gates 96, 98, and 100 which are sampled by a TP 0 pulse passed by gate 102 that is conditioned by the One output level of the instruction request flip-flop 72. The pulse passed by one of these gates on line 104 initiates a transfer of the program counter contents and a start memory read cycle for the proper memory to read an instruction word from the memory address as specified by the contents of the program counter. Also conditioned by output levels from decoder 82 are gates 106, 108, and 110. These gates are sampled by a TP 5 pulse which is passed by gate 112, conditioned by the Zero output level of the overlap flip-flop 80, and gate 114, conditioned by the One output level of the instruction request flip-flop; and a conditioned gate passes the pulse on line 115 to transfer a word from the selected memory buffer register to the first instruction register, index selection register, and central address register.

Gates 116, 118, and 120, associated with the output levels of the decoder 84, are adapted to pass a signal on line 122 to initiate a transfer of the contents of the central address register to the proper memory and a memory read cycle for reading a data word from the memory address specified by the contents of the central address register. These gates are sampled by a TP 0 pulse when that pulse is passed by gate 124 conditioned by the One output level of the data request flip-flop 74.

Gates 126, 128, and 130 are sampled by the TP 0 pulse passed by gate 132 (conditioned by the One output level of the data store flip-flop 76), to pass a pulse on lines 134 which initiates a data store operation of the contents of the memory buffer register in the memory location specified by the contents of the central address register. Gates 136, 138, and 140 are sampled by a TP 2 pulse for initiating a transfer of the data word stored in the arithmetic element to a specified memory buffer register by a pulse on line 142. Gates 144, 146, and 148 are sampled by a TP 3 pulse and transfer the memory identification specified by the contents of the central address register (bits 7 and 8) to one of the memory buffer register selection flip-flops 150, 152, and 154 to provide temporary storage of that information. The One outputs of the flip-flops 150, 152, and 154 are applied to gates 156, 158, and 160 respectively. These gates are sampled by a TP 5 pulse which is passed by the gate 162 when that gate is conditioned by the One output level of the data request flip-flop 74. The conditioned gate passes the pulse on line 164 to initiate the transfer of the data word from the specified memory buffer register to the A-register of the arithmetic element.

The central address register is normally cleared by a TP 4 pulse on line 172 passed by gate 166 (conditioned by the One output level of the instruction request flip-flop 72) and gate 168 (conditioned by a level from the NOT OR-circuit 170). The NOT OR circuit provides a gate conditioning output level only if neither of its inputs are conditioned. One input of the circuit 170 is conditioned by a One output level from branch flip-flop 78 and the other input is conditioned by an output from AND-circuit 92. With this control, the central address register is always cleared before the next instruction address is placed in the register.

The TP 5 pulse normally steps the program counter by a pulse passed on line 174 through gates 112, 114, and 176. The gate 176 is conditioned by the output level of NOT OR-circuit 170.

If, however, the stepping of the program counter and the use of the PCTR/MSD is inhibited (because CAR and PCTR refer to the same memory), a dummy code (all Ones) is placed in the first instruction register by the TP 5 pulse applied on line 178. This pulse is passed through gates 112 (overlap mode), 114 (instruction requested), and 180 (memory conflict), and through OR-circuit 182. Gate 180 is conditioned by the program counter decoder inhibit level from AND-circuit 92.

If the branch flip-flop 78 is set, the resultant One level conditions gate 184 and the TP 5 pulse is passed through that gate and OR-circuit 182 to transfer the dummy code to the first instruction register, or if the overlap control flip-flop 80 is set (nonoverlap), the resultant One level conditions the gate 186 and the TP 5 pulse is passed through that gate and OR-circuit 182 for similarly transferring the dummy code. The pulse passed by gate 186 also clears the overlap flip-flop.

The TP 7 pulse on line 188 clears the memory buffer register selection flip-flops 150, 152, and 154, and rests the cycle control flip-flops 72, 74, and 76 on line 190. It also samples the gate 192, and if that gate is conditioned (by the One output level of the branch flip-flop 78), the pulse is passed on line 194 to transfer the contents of the program counter to the A-register and the contents of the central address register to the program counter to initiate the requested branch operation. The resultant pulse is also applied through OR-circuit 196 to clear the branch flip-flop 78.

An inhibit level is also applied to the program counter decoder 82 through OR-circuit 198 if either the branch flip-flop 78 or the overlap control flip-flop 80 has a One output level.

The instruction request flip-flop 72 is cleared to Zero by a TP 8 pulse on line 202 in a pause operation. The NOT OR-circuit 204 then conditions gate 206 if the branch flip-flop 78 is also cleared to Zero and the next TP 5 pulse is passed by gate 198 through OR-circuit 182 to provide a dummy code transfer pulse on line 178.

Either the data request flip-flop 74 or the data store flip-flop 76 is set by a TP 8 pulse on line 108 or 210 respectively when a data transfer is involved. The pulse is also passed by OR-circuit 212 to sample gate 214 which is conditioned by a nonoverlap level on line 216. The branch flip-flop is set in a branch operation by a TP 2 pulse on line 218 and may be cleared by a pulse on line 220 through OR-circuit 196. the operation of the program control circuitry shown in FIG. 4, the apparatus controls the transfer of instruction and data words between the three memories, 10, 12, 14 and the instruction control circuitry (registers 38,40; decoders 42,44; and command generators 46,48) and the arithmetic unit 54. Two memories may be addressed simultaneously, one by information stored in the program counter 30 and another by information stored in the central address register 28. In order to properly correlate the memory selection operations, the bits of the address information which identify the particular memory are applied through memory selector decoders (MSD). These bits are also compared and should both the central address register and the program counter be requesting a data transfer from the same memory the word transfer specified by the program counter is inhibited.

As shown in FIG. 4, the program counter memory select decoder 82 has two sets of gates coupled thereto and provides control signals on cable 108 for controlling the addressing of a memory unit through a memory address register (MAR), and control signals on line 115 for addressing the memory buffer register (MBR) into which a word from the memory has been transferred to control the transfer of that word to the instruction control circuitry. The central address register memory select decoder 84 has a larger number of similar sets of gates coupled thereto; signals on cable 122 being applied to a memory address register for selecting a memory area for transfer of a word to the computer, signals on cable 134 selecting a memory address register to which a word is to be transferred from the computer, signals on cable 142 selecting a memory buffer register to which a word is to be transferred from the arithmetic unit, and signals on cable 164 selecting a memory buffer register from which a word is to be transferred to the arithmetic unit.

Comparison logic 90 provides an inhibit level on line 242 to prevent the program counter memory select decoder 82 from generating conditioning levels during a cycle in which a data transfer is to be made in those cases where the program counter is specifying the same memory as is to be involved in the data word transfer.

The word transfers are supervised by the cycle control flip-flops 72, 74, 76: flip-flop 72, when set, indicating that an instruction is requested; flip-flop 74, when set, indicating that data is requested; and flip-flop 76, when set, indicating that data is to be stored. The output levels from these flip-flops condition the gating logic and control the application of timing pulses for the addressing of memory components.

Two additional control flip-flops are provided, a branch control flip-flop 78 which is set when the branch condition is detected, and an overlap control flip-flop 80 which is set only when the computer is operating in the "nonoverlap" mode, that is in the mode where only a single memory request at most is made in each cycle.

As indicated above, this program control circuitry controls the transfer of words between the several memories and the instruction registers and the arithmetic element. The instruction control element contains two instruction registers 38 and 40. The program control element enables two different instructions to be stored in the instruction registers 38 and 40 with commands being generated for the execution of both instructions from the command generators 46 and 48 at the same time. This dual execution of instructions is feasible in this machine as all instructions employ a first cycle for decoding, address modification and indexing purposes, and if the arithmetic element is to be employed that operation occurs in the second instruction cycle. Where there is no interference between these two operations, the two instructions may be executed concurrently and thus the overall speed of computer operation is substantially increased. However, there are circumstances where the concurrent or overlap execution of instructions must be inhibited. The computer has a facility for overriding the overlap mode of operation entirely through the use of a nonoverlap signal level applied on line 216 to set the overlap flip-flop 80. In that situation the signals leave from the memory select decoder are automatically inhibited in any cycle involving a data transfer operation between the computer and one of the several memories. In such operation a dummy code (in this embodiment all Ones) is transferred over line 178 to the first instruction register at the same time that the instruction is transferred from the first instruction register to the second instruction register for further processing. Other conditions where this dummy code is transferred occur where the computer enters a pause (indicated by the clearing of the instruction request flip-flop 72) and no branch condition exists; where a branch condition exists; and when the computer is operating in the overlap mode, where an instruction is requested from the same memory which is to be involved in a data transfer.

The gating logic also controls stepping of the program counter (line 174) in response to a gated TP 5 pulse, the clearing of the central address register (line 172) in response to a gated TP 4 pulse and a branch operation in which the contents of the program counter are transferred to the A-register and the contents of the central address register are transferred to the program counter in response to a gated TP 7 pulse (line 194).

Figure 5:
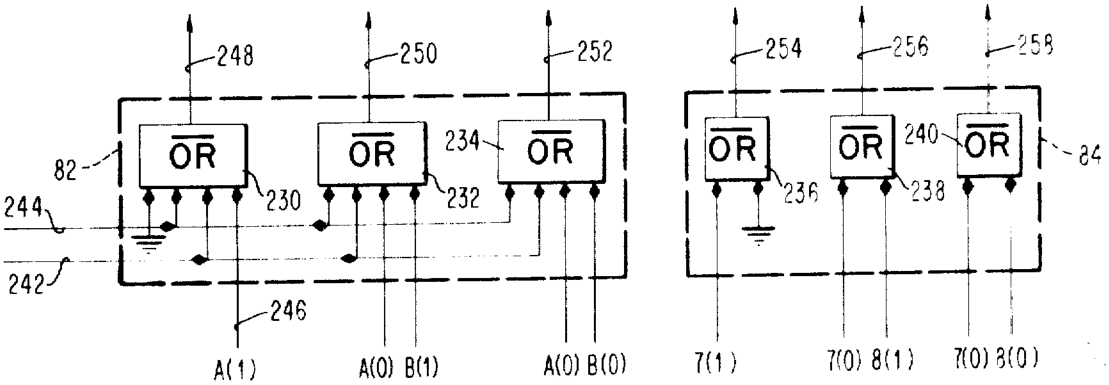
FIG. 5 is a logical block diagram of the memory selection decoders utilized in the program control element.

A logical block diagram of the memory select decoders 82, 84 is shown in FIG. 5. Each decoder is composed of three NOT OR-circuits 230, 232, and 234, and 236, 238, and 240 respectively. These circuits may be of the type described in the copending applications Ser. No. 822,796 titled Control Circuit for Digital Computer filed in the name of Peter J. Mancuso on June 25, 1959 issued as U.S. Pat. No. 3,142,041 on July 21, 1964 or Ser. No. 824,105 titled Asynchronous Multiplier filed in the name of C. J. Filton on June 30, 1959, issued as U.S. Pat. No. 3,085,747 on Apr. 16, 1963. In this type of NOT OR circuit, an appropriate output is obtained only if none of the inputs is appropriately conditioned. In the circuitry of decoder 82 conditioning levels are normally not present on line 242 (from AND-circuit 92) and on line 244 (from OR-circuit 198). The grounded input of circuit 230 naturally is not a conditioning input. Thus, if the bit of most significant stage A of the program counter is Zero (identifying memory 10), the input line 246 corresponding to the One level of the most significant stage is not conditioned and the circuit 200 has an output on line 248. Similarly if the most significant bit (A) is One and the next bit (B) is Zero (identifying memory 12) circuit 232 develops an output on line 250 and if both bits (A and B) are One (identifying memory 14) circuit 234 develops an output on line 252.

The central address register memory selection decoder 84 functions in a similar manner: an output of NOT OR-circuit 236 on line 254 specifies memory 10, an output on line 256 specifies memory 12 and an output on line 258 specifies memory 14. The bit positions connected to the input lines of the NOT OR circuits correspond to bits 7 and 8 in the instruction word.

The program counter decoder 82 is slightly more complex than the central address register decoder due to the use of inhibiting levels on lines 242 and 244 each of which is effective, when conditioned, to inhibit all outputs from the decoder, as all of the NOT OR circuits in the decoder have a conditioning level applied thereto. This arrangement, in conjunction with other control functions of the program control element, provides improved and more flexible control of the processing of instructions.

In the operation of the computer, the address of the next instruction word to be selected is determined by the contents of the program counter 30. In this embodiment, counter 30 contains 13 stages. The first two stages specify the memory and the 11 subsequent stages specify the address of the instruction word to be selected in that memory. Thus if the first stage is Zero memory 10 is specified. If the first stage is One and the second stage is Zero, memory 12 is specified and if both the first and second stages are One, memory 14 is specified. These stages correspond to bits 7 and 8 of an instruction word. The program counter is designed so that it will step sequentially through memories 10, 12, and 14. Initially, the contents of the program counter 30 are applied over line 60 at TP 0 time to condition one of the memory address registers when initiating a read cycle. The word at the specified address is then transferred into the associated memory buffer register. At TP 5 bits S and 1 of the contents of the memory buffer register are transferred to the index selection register, bits 2–6 to the first instruction register in instruction control and bits 7–19 to the central address register.

When an instruction is indexable, bits S and 1 must be examined to determine whether indexing is required. Three index registers represented as block 32 are utilized in the preferred embodiment. If both bits are Zero, no index register is specified. If bit S is Zero and bit 1 is One, index register 1 is specified, if bit S is One and bit 1 is Zero, index register 2 is specified and if both bits are One, index register 3 is specified. Indexing refers generally to the modification of the address portion of an instruction by some predetermined quantity, that quantity being the contents of a specified index register. This modification occurs during the time period TP 7–9 prior to the time that the address portion is transmitted to a memory address register. The contents of a specified index register may also be modified by the contents of the index interval register 36 for the branch on positive index instruction. The actual address modification operation is performed in the central address register by means of a pulse-type adder of the type disclosed in the copending application Ser. No. 823,996, titled "Adder Circuit," filed in the names of E. T. Hall, J. D. Newton, and J. R. Wood on June 30, 1959 issued as U.S. Pat. No. 3,042,304 on July 3, 1962.

After modification of the operand address, the contents of the central address register are transmitted over line 68 to the memory address registers at TP 0 of the next memory cycle to read out the operand through the associated memory buffer register to the arithmetic element. There the operations specified by the instruction are performed. In overlap operation the next instruction (whose address is specified by the program counter) is read from one memory at the same time the operand of the current instruction is read from another memory. The functions of the program control element and examples of certain novel features of this apparatus may be better understood from a description of the data-processing steps involved in an illustrative table look-up program:

| Memory Address of Instruction | Instruction Bits S–1 (Ind. Sel.) | Bits 2–6 (Instr.) | Bits 7–19 (Address) |
|---|---|---|---|
| $00004)_8$ | 00 | 10011 | $00001)_8$ |
| $00005)_8$ | 10 | 10001 | $00012)_8$ |
| $00006)_8$ | 10 | 00110 | $00504)_8$ |
| $00007)_8$ | 00 | 00101 | $17100)_8$ |
| $00010)_8$ | 00 | 01001 | $06326)_8$ |
| $00011)_8$ | 10 | 01011 | $00006)_8$ |

This program includes the following instructions:

LXI (Load Index Interval Register) (10011)
- load the index interval register with the amount specified by the address part of this instruction (i.e., the binary value One).

LDX (Load Index Register) (10001)
- load the index register specified by the index selection bits (i.e., No. 2) with the number specified by address part of this instruction (i.e., $00012)_8$).

LAC (Load Accumulator) (00110)
- load the accumulator with the operand which is stored in the memory location specified by the sum of the address part of this instruction and the current contents of the index register specified by the index selection part of this instruction. If no index register is indicated, the address part of the instruction specifies the memory location of the operand.

SUB (Subtract) (00101)
- subtract, from the contents of the accumulator, the operand which is stored in the memory location specified by the sum of the address part of this instruction and the current contents of the index register specified by the index selection bits of this instruction. If no index register is indicated, the address part of the instruction specifies the memory location of the operand.

BOZ (Branch on Zero) (01001)
- if the accumulator contents equal Zero, this instruction causes the computer to take the next instruction from the location specified by the address part of this instruction. If the accumulator contents are not Zero, the next consecutive instruction is taken in sequence.

BPX (Branch on Positive Index) (01011)
- this instruction will cause the computer to take the next instruction from the memory location specified by the address part of this instruction if the contents of the specified index register are positive. The index register is reduced by an amount equal to the contents of the index interval register. If the contents of the specified index register are negative, the next instruction is taken in sequence and the index register contents are unchanged.

This program will sequentially extract the data words from ten consecutive addresses commencing at $00516)_8$ (the address specified by LAC as modified by the initial contents of index register 2) and compare each extracted word with the word at $17100)_8$ (the address specified in the SUB instruction) until an extracted word compares exactly and then will branch to the program commencing at $06326)_8$ (the address specified in the BOZ instruction).

The LAC and SUB instructions may be overlapped with other instructions provided there is no conflict in the use of the memories. The timing diagram of FIG. 3 indicates the progress of this program in the subject computer.

The entire program is stored in memory 10 as indicated by the fact the first two bits of each memory address are Zeros (the octal notation being used in the table for space saving purposes). The first instruction, load index interval register (LXI) is read from memory 10 commencing at time TP $0_1$. This read cycle operation is initiated under the control of the Program Control element by a TP 0 pulse which samples gates 96, 98, and 100. Gate 96 is conditioned by the output level of the program counter memory select decoder 82 on line 248. At the same time, the contents of the program counter 30 are transferred on lines 60 to the memory address register 22 for specifying the memory location of the LXI instruction. At TP $5_1$ time the program counter is stepped (to $0005_8$) and the contents of the memory buffer register 16 are transferred over lines 62, 64, and 66 to the index selection register 34, the first instruction register 38, and the central address register 28 respectively. The latter operation is initiated by the program control element when the gates 106, 108, and 110 are sampled by the TP $5_1$ pulse that passes through gates 112 and 114. As gate 106 is conditioned a pulse is applied on line 115 to condition the memory buffer register 16 for this transfer. By TP $7_1$ time, the instruction is decoded in decoder 42 and commands are generated from command generator 46 to first clear the index interval register at TP 7 time, then to transfer the value specified by the address portion of the instruction (which was stored in the central address register over line 66) to the index interval register 36 over lines 260.

As indicated in FIGS. 3 and 4, TP $7_1$ sets the IR flip-flop 72, and resets the DR and DS flip-flops 74,76 (the cycle control flip-flops). At TP $0_2$ the decoder 82 is sampled to start the next memory read cycle for reading out the LDX instruction; meanwhile at TP $2_2$ time a portion of the contents of the central address register (bits 14–19) is transferred to the index interval register in complement form and at TP $4_2$ the central address register is cleared. The TP $5_2$ pulse is passed to sample gates 106, 108, and 110 and initiates a transfer of the contents of memory buffer register 16 to the instruction handling registers. The TP $5_2$ pulse is also passed by gate 176 (conditioned by the NOT OR-circuit 170 output level; this circuit always conditions gate 176 if none of the flip-flops, data request 74, data store 76, branch 78, and overlap 80 are not set and the instruction request flip-flop 72 is set) to pass a step program counter pulse on line 174 to step the program counter to the octal value $00006)_8$. The TP $5_2$ pulse also automatically effects the transfer of the contents of the first instruction register 38 to the second instruction register 40. No commands issue from generator 48 however as the LXI instruction requires only one cycle and has already been completed.

The cycle control flip-flops are again set up by a TP $7_2$ pulse (i.e., instruction request flip-flop set to One, and the data request and data store flip-flops cleared). Also at TP $7_2$ time, the specified index register (No. 2) is cleared by a command pulse. The TP $0_3$ pulse samples gates 96, 98, and 100. Again gate 96 is conditioned and a start memory read cycle is initiated and the PCTR contents transferred to memory address register 22 to read the LAC instruction from memory 10. The TP $2_3$ pulse transfers the contents of the central address register to the specified index register (No. 2) in accordance with bits S and 1 of the LDX instruction over lines 262. The TP $4_3$ pulse is passed by gates 166 and 168 and on line 172 to clear the central address register and the index selection register. The TP $5_3$ pulse, passed by gates 112, 114, and 106, transfers the respective portions of the LAC instruction from the memory buffer register 16 to the index selection register, the central address register, and the first instruction register; and steps the program counter to $00007)_8$ by a pulse passed through gate 176 on line 174. Just prior to this, the LDX instructions was transferred from the first instruction register to the second instruction register. No commands are issued from generator 48 since the LDX instruction uses only one cycle.

At TP $7_3$ time the cycle control flip-flops are set up again as before and it is determined (by the index selection decoder) that index register No. 2 is to be used for indexing for the LAC instruction. As a result the address portion of the instruction stored in the central address register is modified by the contents of index register 2 in an index add operation that commences at TP $7_3$ with a transfer over line 264 and completed by TP $9_3$ time. At TP $8_3$ the data request flip-flop 74 is set by a command applied on line 208 since this is an operand-handling instruction.

At TP $0_4$ time the program counter decoder gates 96, 98, 100 and the central address register decoder gates 116, 118, 120 are sampled. Since the address of the operand specified by the LAC instruction is in the same memory as the SUB instruction the compare logic 90 has an output effective to inhibit the decoder 82. Therefore only gate 116 is conditioned and the address of the operand is sent to the memory address register 22 and a start read cycle is initiated. Thus an ambiguity in conditioning levels applied to memory select devices is avoided and the operand request is given priority over the instruction request. At TP $3_4$ time the decoder gates 144, 146, and 148 are sampled and the memory identification indicated by the central address register is transferred to memory buffer register selection flip-flop 150. (The central address register and index selection register are not cleared at TP $4_4$ time because of the program counter inhibit level being applied to NOT OR-circuit 170). At TP $5_4$ time the contents of the first instruction register 38 are transferred to the second instruction register 40 and the operand specified by the LAC instruction is read from the memory buffer register 16 into the A-register 56. (At TP $5_4$ time the program counter stepping pulse on line 174 is inhibited due to the removal to the conditioning level on gate 176 from NOT OR-circuit 170 but a pulse is passed through gate 180 and OR-circuit 182 on line 178 to place a dummy code of all ones in the first instruction register 38. The dummy code is used to provide a skip cycle and is arranged to provide TP 0 and TP 5 pulses for the reading out of the next instruction). Again, TP $7_4$ sets up the cycle control flip-flops. A command from generator 48 transfer the contents of the A-register 56 to the accumulator 58 over lines 266. The foregoing is an example of nonoverlap operation which occurs whenever both the operand and next instruction are obtained from the same memory.

Since the contents of the program counter remained unchanged the device continues to specify the address of the next instruction (SUB). Thus, the TP $0_5$ pulse is passed by gate 102 and samples the conditioned gate 96 to induce a pulse on line 104 for transferring the address of the SUB instruction from the counter 30 on line 60 to the memory address register 22 and to start a memory read cycle. A TP $4_5$ pulse is also generated via gates 166 and 168 on line 172 to clear the index selection register and central address register. The central address register memory selection decoder 84 is not sampled by this pulse at TP $0_5$ time as gate 124 is not conditioned by the data request flip-flop. At TP $5_5$ time, gate 106 produces an output on line 115 to read the contents of MBR 16 (the SUB instruction) to the index selection register, first instruction register, and the central address register. At the same time, the program counter is stepped to $00008)_8$. The TP $7_5$ pulse sets up the cycle control flip-flops and a command from generator 46 sets the data request flip-flop 74 by a pulse on line 234 at TP $8_5$ time. Since no index register was specified by the SUB instruction, indexing is not carried out.

At TP $0_6$ time the program counter and the central address register decoders are sampled. Since they refer to different memories (the operand being in memory 12 and the BOZ instruction in memory 10) pulses are passed on both lines 104 and 122 to initiate the reading of the instruction word from memory 10 and the operand from memory 12. The addresses for these information words are transferred from the program counter and the central address register simultaneously to the memory address registers 22 and 24, respectively.

At TP $3_6$ time the gates 144, 146, and 148 are sampled and as gate 146 is conditioned flip-flop 152 is set. At TP $4_6$ time the central address register, the second instruction register, and the A-register are cleared. At TP $5_6$ time the contents of the first instruction register are transferred to the second instruction register and the memory buffer registers 16 and 18 are sampled. The BOZ instruction bits are transferred from register 16 to the index selection register, the central address register, and the first instruction register and the operand is transferred from register 18 to the A-register. The program counter is also stepped to $00009)_8$ by the pulse. A delayed TP 5 pulse is applied to the A-register to complement that register after the operand is placed therein.

Between TP $5_6$ and TP $5_7$ time, the BOZ instruction is overlapped with the SUB instruction, BOZ being performed from command generator 46 and SUB being carried out to completion from command generator 48.

At TP $7_6$ time the addition process is started in the arithmetic unit by a command from generator 48 to effectively subtract the word stored in the A-register from the word in the accumulator leaving the difference in the accumulator. The cycle control flip-flops are set up at TP $7_6$ and the processing of the branch on Zero instruction is also commenced. (This instruction is indexable but no indexing is specified in this particular example.) Thus the branch on Zero instruction is commenced while the operation upon which it is dependent is incomplete. This general type of concurrent instruction processing may be used whenever the first instruction specifies an operand upon which a simple arithmetic manipulation is to be performed.

For the branch on Zero instruction, the test for Zero in the accumulator cannot take place until a previous add or subtract instruction has been fully completed and the accumulator settled. This means that the branch on Zero instruction would normally take two cycles since, in the given example, the accumulator may not be settled until TP $2_7$ time. To reduce the BOZ execution time, the BOZ instruction is designed such that the next instruction is brought out of memory after one cycle, assuming that the Zero test will fail. If the assumption was found to be true at TP 2 time in the second cycle, then the next instruction is processed. If the assumption was not true, then the next instruction (which has been placed in a memory buffer register) is ignored and a transfer of control is made to the memory address specified by the address part of BOZ.

At TP $0_7$ the Program Counter Decoder 82 is sampled by a pulse passed through gate 102 and the resultant pulse on line 104 starts the memory read cycle for the next instruction as specified by the contents of the program counter, the BPX instruction.

At this same time (TP $0_7$) the addition process in the arithmetic element is being completed and a parity check operation is being initiated. Elements of three instructions are thus being simultaneously processed by the computer. The SUB instruction is being completed; the BOZ instruction is in the midst of execution; and the BPX instruction is being read from memory. The future course of action as determined by the BOZ instruction is dependent on the result of the SUB instruction since the BPX instruction will not be used if the condition the BOZ instruction seeks is met. However, it is more probable in this example of a table look-up operation that that condition will not be met and therefore the BPX instruction is initiated.

At TP $2_7$ the branch flip-flop 78 is set by a pulse on line 218 and the accumulator sign stage is sampled. If the bit in that stage is One, the accumulator is complemented to make the contents thereof positive. At TP $3_7$ the accumulator is sampled for positive Zero and if any accumulator bit is One the branch flip-flop is cleared by a pulse on line 220 indicating that the sought condition does not exist. In this case, the computer clears the index selection register and the central address register (at TP $4_7$ time) and transfers (at TP $5_7$ time) the BPX instruction now in the memory buffer register 16 to the index selection register, first instruction register, and central address register. This instruction creates a branch of control back to the load accumulator instruction in a single instruction cycle which has been initiated before the establishment of the conditions for branching in accordance with BOZ instruction. In typical data search operations, there are more failures to locate the desired value than there are successes. This portion of the computer organization thus enables a significant increase in data-processing operation rates.

However, if the branch flip-flop remains set (indicating criterion met), the One output level of the branch flip-flop is applied to NOT OR-circuit 170 to remove the conditioning level from gates 176 and 168 and thus inhibit the stepping of the program counter and the clearing of the central address register. Gate 184 is conditioned to pass a TP $5_7$ pulse through OR-circuit 182 for placing the dummy code in the first instruction register. The branch flip-flop also conditions OR-circuit 198 to inhibit the program counter memory selection decoder 82 so that no start memory read cycle is initiated to bring out a new instruction.

At TP $7_7$ the branch flip-flop is sampled and being set the pulse is passed by gate 192 to clear the branch flip-flop 78 through OR-circuit 196. Also the contents of the program counter are transferred to the A-register and the contents of the central address register (the BOZ address) are transferred to the program counter over lines 268 by this pulse on line 194. This places the address of the first instruction of the new program sequence to which this computer is branched (as specified by the address portion of the BOZ instruction) in the program counter and the next instruction is withdrawn from that address. The new program sequence commencing with that instruction then proceeds sequentially in normal fashion.

Another feature of the organization is the provision of overlap control (control of the concurrent instruction execution mechanism) by means of the flip-flop 80. This flip-flop may be set by a data request or data store signal applied on lines 208 or 120 through OR-circuit 212 to sample gate 214. That gate is conditioned by a nonoverlap level on line 216 that is controlled by a manually operated switch. When that flip-flop is set the program counter decoder is inhibited. This circuit connection is utilized in the preferred embodiment primarily for maintenance as it enables an instruction to be processed without overlap in single-pulse steps so that the various instruction steps may be conveniently observed.

Thus it will be seen that this computer program processing organization enables a much higher rate of data processing as concurrent execution of a plurality of instructions is made possible. Where an ambiguity arises within the organization in this concurrent instruction prosecution the system automatically senses this ambiguity and affixes a priority to the instruction which has progressed furthest. The subsequent instructions are deferred until the condition causing the ambiguity has been alleviated. A further feature of the system is the provision of a tentative instruction initiation when that instruction is dependent upon the existence of a condition which is not established until after that cycle is initiated. This feature enables significant increase in the data processing rate as the most probable instruction is the one that is preferably tentatively initiated. Certain other advantageous features have been pointed out in the specification and still others will be obvious to those skilled in the art. While there has been shown and described in the herein a preferred embodiment of the invention it will be understood that the invention is not intended to be limited thereto or to details thereof and departures may be made therefrom within the spirit and scope of the invention as defined in the claims.

I claim:

1. A data-processing machine arranged for the processing of data in accordance with instructions, comprising a plurality of elements for storing information words representative of said data and of said instructions, means for extracting information words from said elements, and processing means for processing said information words in accordance with said instructions, said processing means including a plurality of instruction registers for receiving at least two different instructions from said extracting means and control means responsive to contents of said registers for generating commands to effect the concurrent processing of said two different instructions.

2. The data-processing machine as claimed in claim 1 wherein said processing means further includes branching means for causing said machine to select a predetermined subroutine in response to an instruction, means for initiating the more probable of two possible subroutines that are contingent upon the result of a data-processing operation before that result is available, and inhibiting means responsive to said result when available to inhibit said more probable subroutine when said result responsive means indicates a predetermined data result.

3. A data-processing machine arranged for the processing of data in accordance with instructions, comprising a plurality of elements for storing information words representative of said data and of said instructions, means for extracting information words from said elements including means for concurrently obtaining two information words from said storage elements, means for preferentially obtaining one of said information words where access to the same storage element is being sought for both said information words, and processing means for processing said information words in accordance with said instructions, said processing means including control means for receiving at least two different instructions from said extracting means and effecting the concurrent processing of said two different instructions.

4. A data-processing machine as claimed in claim 3 wherein said information words are a next instruction word and a data word at an address specified by an instruction word preceding said next instruction word and said data word is the word preferentially obtained by the means therefor.

5. A data-processing machine adapted to process signals representative of data in accordance with a program of instruction words comprising a plurality of storage devices for storing said data signals and said instruction words, arithmetic means for processing a data word in accordance with an instruction word, first and second instruction registers, and program control means for controlling the transfer of instruction words and data signals from said storage devices in accordance with said program to enable the processing of data words by said arithmetic means and to effect the concurrent execution of more than one of said instructions, said program control means including means for transferring a first instruction word from a said storage device to said first instruction register for decoding and processing and for transferring a second instruction word from a said storage device to said first instruction register for the initiation of its decoding and processing before the completion of the processing of said first instruction word, and means to transfer said first instruction word to said second instruction register at substantially the same time that said second instruction word is transferred to said first instruction register with the continued processing of said first instruction word being controlled from said second register.

6. A data-processing machine adapted to process signals representative of data in accordance with a program of instruction words comprising a plurality of storage devices for storing said data signals and said instruction words, arithmetic means for processing a data word in accordance with an instruction word, first and second instruction registers, program control means for controlling the transfer of instruction words and data signals from said storage devices in accordance with said program to enable the processing of data words by said arithmetic means and to effect the concurrent execution of more than one of said instructions, said program control means including means for transferring a first instruction word from a said storage device to said first instruction register for decoding and processing and for transferring a second instruction word from a said storage device to said first instruction register for the initiation of its decoding and processing before the completion of the processing of said first instruction word, and means to transfer said first instruction word to said second instruction register at substantially the same time that said second instruction word is transferred to said first instruction register with the continued processing of said first instruction word being controlled from said second register, branching means for causing said machine to select a predetermined program subroutine in response to an instruction, means for initiating the more probable of two possible subroutines that are contingent upon the result of a data-processing operation in said arithmetic means before that result is available, and inhibiting means responsive to said result when said result is available to inhibit further processing of said more probable subroutine by said program control means when said arithmetic means produces a predetermined data result and to initiate processing by said program control means of the less probable of said two possible subroutines.

7. The data-processing machine as claimed in claim 5 wherein said program control means includes means for sensing data and instruction requests, and means for preferentially obtaining a data word when access to the same storage device is being sought for a data word and an instruction word.

8. The data-processing machine as claimed in claim 5 and further including means for inhibiting the concurrent processing of said instructions.

9. The data-processing machine as claimed in claim 5 and further including branching means responsive to an instruction for causing said machine to branch to a subprogram of instructions, said branching means being responsive to a particular condition, means for initiating the processing of the more probable of two possible subroutines of instructions that may immediately follow said branch instruction before the existence of said condition is determined, and means responsive to said condition for optionally inhibiting the processing of said more probable subroutine of instructions.

10. The apparatus as claimed in claim 9 wherein said branching means includes means operative when said condition is determined to exist to inhibit selection of the next instruction in the more probable subroutine by said program control means and to transfer the address of the first instruction in the less probable subroutine to said program control means so that the first instruction in said less probable subroutine is read from a said storage device during the memory cycle immediately following the determination that the condition exists.

11. A data-processing machine arranged for the processing of data in accordance with instructions, comprising a plurality of elements for storing information words representative of said data and of said instructions, means for extracting information words from said elements including means for concurrently requesting instruction and data signals from said storage devices and means for sensing said data and instruction transfer requests, said sensing means permitting the reading of requested data signals from a storage device in preference to a requested instruction where the concurrently requested information words are both stored in the same storage device, and processing means for processing said information words in accordance with said instructions, said processing means including control means for receiving at least two different instructions from said extracting means and effecting the concurrent processing of said two different instructions.

12. A data-processing machine adapted to process signals representative of data in accordance with instructions, said machine being operable in a sequence of instruction cycles which may be arranged as several programs of data-processing instructions and having means for cycling said machine in a first program of instructions, branching means responsive to an instruction of said first program for causing said machine to branch to a second program of said instructions if a certain condition exists including sensing means to determine if said condition exists, means for initiating the processing of a next instruction before said sensing means can determine if said condition exists, and means responsive to said sensing means for inhibiting the processing of said next instruction and initiating the processing of another instruction.

13. A data-processing machine as claimed in claim 12 wherein said next instruction is from said first program, said substitute instruction is from said second program, and it is more probable that said condition will not exist than that it will exist.

14. In a digital computer cyclically operative to process data signals in accordance with a program of instruction words, each instruction word including an instruction portion adapted to control the generation of commands and an address portion which may specify the address in a memory element of a data word operand to be manipulated in accordance with commands generated under the control of said instruction portion, having arithmetic means adapted to process data words in accordance with commands generated in response to said instruction portions, means for specifying the memory address of the next instruction to be executed by said computer, and means responsive to said address portion for specifying the memory address of the required data word operand, a plurality of memory elements for storing said data signals and said instruction words, and program control means including a plurality of instruction-decoding and command-generating means, each said instruction-decoding and command-generating means including a register for storing an instruction portion, means to concurrently reference said memory elements in accordance with said instruction specifying means and said data word specifying means and to read out instruction and data word signals from the referenced memory elements in parallel, means responsive to said memory reference means normally operative to transfer the instruction portion of a first instruction word read out from a first memory element to a first one of said instruction decoding means, and the data signals read out from a secondary memory element to said arithmetic means, said transfer means being subsequently operative to transfer the instruction portion of said first instruction word to a second one of said instruction decoding means, and to transfer a second instruction word specified by said instruction specifying means from one memory element to said first instruction-decoding means and to transfer the data word signals specified by said data word-specifying means from another memory element to said arithmetic means for processing in accordance with the instruction portion of said first instruction word in said second instruction-decoding means to enable said data word signals to be processed in accordance with said first instruction for obtaining a data result while the processing of said second instruction is concurrently proceeding.

15. The apparatus as claimed in claim 14 wherein said program control means further includes means to inhibit memory reference by said instruction-specifying means during any memory cycle that said data word-specifying means and said instruction word-specifying means are referencing the same memory element.

16. The apparatus as claimed in claim 14 wherein said program control means further includes means optionally operative to inhibit the concurrent reference of memory elements by said instruction specifying means and said data word-specifying means.

17. A data-processing machine arranged for the processing of data in accordance with sequentially presented instructions comprising a memory means for storing digitally coded information words representative of said data and said instructions, arithmetic means adapted to process data words in accordance with said instructions, control means for receiving instruction words from said memory means and generating commands in response to said instruction words to effect the processing of data words by said arithmetic means, and means to transfer at the same time from said memory means a data word to said arithmetic means to be processed by one instruction word and a second instruction word to said control means, said second instruction word being transferred to said control means while said one instruction word is held in said control means.

18. In a digital computing system having storage means for retaining coded information applied thereto, first instruction-register means connected to receive from said storage means combinations of coded signals constituting an instruction message portion, and arithmetic means adapted to perform calculating operations in response to signals from said first register means corresponding to an instruction message portion stored therein, the combination therewith of control means including:

second instruction-register means connected to receive instruction message portions from said storage means;

selector means operative, in the presence of a first instruction message portion in said first register means and a second instruction message portion in said second register means, for identifying a third instruction message in said storage means in response to an address portion of said second instruction during performance of a calculating operation by said computer in response to an instruction message portion of said first instruction; and signal-responsive means operable by an execution signal from said computer indicative of the completion of a calculating operation for clearing said first register means of said first instruction message portion and thereafter initiating a transfer of said second instruction message portion from said second register means to said first register means and a transfer of an instruction portion of said third message to said second register means, thereby enabling said arithmetic means to operate on a portion of said second instruction message during transfer of said third instruction message and identification by said selector means of a further instruction message in said storage means.

19. A digital computer having a memory for storing instructions, control means including means for extracting instructions from the memory, first means for storing said instructions and performing steps in the manipulation thereof, second means for storing said instructions and performing steps in the manipulation thereof, means for transferring an instruction from said first means to said second means and means for transferring a further instruction to said means after said first named instruction has been transferred to said second means, and while said first named instruction is stored in said second means.

20. A digital computer having arithmetic means, an addressable memory for storing instruction words and operand words, and a plurality of addressable registers for storing operand words, control means including sequencing means for extracting instruction words from said memory, a first instruction register coupled to said memory for storing instruction words extracted from said memory, a second instruction register to which instruction words are transferred from said first instruction register, means for extracting operand words from said memory and from said addressable registers as determined by the contents of an instruction word, and for transferring said operand words to said arithmetic means, an address register storing the address of an addressable register and means controlled from the instruction words stored in the first and second instruction registers and the address register effective to control the transfer of instruction words from the memory to said first instruction register, and from said first instruction register to said second instruction register so that a plurality of instruction words are manipulated concurrently.

21. A digital computer having a memory for storing instructions and operands, apparatus coupled to said memory for selecting operands and instructions, arithmetic means coupled to said memory to receive said operands, and control means coupled to said memory for receiving instructions and controlling said computer in response thereto having means for processing instructions in an overlapping sequence including a first register for storing a part of an instruction designating an address in said memory, a second register for storing a part of an instruction controlling the operation of said arithmetic means, a third register for storing a part of an instruction which controls said apparatus for the selection of operands and instructions, and means coupled to said registers and said memory for controlling the transfer of instructions to said registers whereby said registers store at least portions of different instructions so that different steps in the overall processing of a plurality of instructions may be carried out simultaneously.

22. A digital computer having a memory for storing instructions and operands, arithmetic means for the arithmetic processing of operands, and a plurality of instruction registers for storage of instructions, means effective to generate signals controlling the transfer of data between said memory and said instruction registers, and between said memory and said arithmetic means so that different steps in the processing of data from a plurality of instructions may be carried on simultaneously, means responsive to contingencies arising from the nature of the instruction to be processed and from accessibility of a memory, effective to suspend the transfer of data and responsive to termination of such contingencies for restoring said suspended transfer of data so that minimum interference occurs in the simultaneous processing of said different steps from said plurality of instructions.

23. A digital computer having a memory means for storing data comprising instructions and operands which memory means during a designated time period may or may not be accessible, means producing a signal indicating the accessibility of said memory means, means responsive to instructions for governing the operation of said computer comprising a plurality of registers for storage of instruction data whereby different steps in the processing of a plurality of instructions may be carried on by said computer simultaneously, sequencing means calling for the extraction of instruction data from said memory, and control means responsive to said signal effective to control the operation of said sequencing means and transfers of instruction data between said registers wherein said control means is maintained in a predetermined condition by generation of a memory accessibility signal thereby to cause said sequencing means during said designated time period to extract new instruction data from said memory means.

24. A digital computer having a memory means for storing data comprising instructions and operands which memory means during designated time period may or may not be accessible for data transfers, means producing signals indicating the accessibility of said memory and means responsive to instructions for governing the operation of said computer comprising a plurality of registers for the storage of a plurality of instructions whereby different steps in the processing of a plurality of instructions may be carried on by said computer simultaneously, sequencing means calling for the extraction of instruction data from said memory means and control means effective to control the operation of said sequencing means, said control means including first means responsive to signals indicative of the accessibility of said memory for an instruction to develop an actuating signal for said sequencing means, and second means responsive to the condition of said first means so that on failure of a memory accessibility signal said second means remains in a predetermined condition and said sequencing means makes a repeated memory call for the same instruction.

25. A digital computer having a memory for storing instructions, means for extracting a sequence of instructions from said memory, a plurality of instruction registers coupled to said memory for receiving and storing said sequence of instructions wherein at least two of said instruction registers store different instructions, means coupled to said at least two instruction registers for manipulating a plurality of instructions concurrently, instruction execution means controlled by an instruction from one of said instruction registers for executing said instruction, and control means for causing said instruction execution means to be controlled by a different instruction from said instruction registers after said execution means has responded to the instruction last controlling it.

26. The computer defined in claim 25 wherein said means for extracting instructions is governed by said control means to extract a new instruction from said memory for transfer to said instruction registers after said instruction execution means has responded to the instruction last controlling it.

27. A digital computer having arithmetic means for performing computations, an addressable memory having a plurality of locations for storing instructions and operands, said instructions comprising a portion designating an operation to be performed by said computer and at least one address portion indicative of an address in said memory, control means for extracting instructions from said memory, a plurality of instruction registers for receiving instructions from said memory including at least a first instruction register coupled to said memory for storing instructions extracted from said memory, a second instruction register coupled to said first instruction register for receiving instructions from said first instruction register, an address register adapted to receive a portion of an instruction specifying an address in said memory and means controlled by at least one portion of an instruction stored in one of said first and second instruction registers and the address stored in said address register effective to control the transfer of instructions from the memory to said first instruction register, and from said first instruction register to said second instruction register so that a plurality of instructions are being manipulated concurrently.

28. A digital computer having arithmetic means for performing computations, an addressable memory having a plurality of locations for storing instructions and operands; said instructions comprising a portion designating an operation to be performed by said computer and at least one address portion indicative of an address in said memory, control means including sequencing means for extracting instructions from said memory in a sequence, a plurality of instruction registers for receiving instructions from said memory including at least a first instruction register coupled to said memory for storing instructions extracted from said memory, a second instruction register coupled to said memory for storing instructions extracted from said memory, an address register adapted to receive a portion of an instruction specifying an address in said memory and means controlled by at least one portion of an instruction stored in one of said first and second instruction registers and the address stored in said address register effective to control the transfer of instructions from the memory to said first instruction register and to said second instruction register so that a plurality of instructions are being manipulated concurrently.

29. A digital computer comprising an addressable memory having a plurality of locations for storing instructions, said instructions comprising a portion designating an operation to be performed by said computer and at least one address portion indicative of an address in said memory, control means for addressing said memory to extract instructions from said memory, a plurality of instruction registers for receiving instructions from said memory, means adapted for receiving from said memory an address portion of an instruction word and for addressing said memory in response thereto, means operative to produce a signal when a conflict may occur in concurrently addressing said memory from said control means and said receiving means, and means responsive to the output of said signalling means to control the transfer of instructions from said memory to said instruction registers.

30. A digital computer comprising an addressable memory having a plurality of locations for storing instructions and operands, said instructions comprising a portion designating an operation to be performed by said computer and at least one address portion indicative of an address in said memory, control means for addressing said memory to extract instructions from said memory in a sequence, first and second instruction registers for receiving instructions from said memory, means coupled to said instruction registers for processing a plurality of instructions concurrently, means adapted for receiving from said memory an address portion of an instruction word and for addressing said memory in response thereto, signaling means operative to produce an output when said memory is successfully addressed by either said control means or said receiving means, and means controlled by the output of said signaling means effective to control the transfer of instructions from the memory to said first instruction register, and from said first instruction register to said second instruction register so that a plurality of instructions are being manipulated concurrently.

31. A digital computer having memory means for storing instructions and operands, sequencing means, arithmetic means and at least first and second instruction registers for storing instructions, cycling means comprising means effective to actuate said sequencing means to extract first and second instructions from said memory means, means effective to control the modification of a portion of said first instruction and transfer another portion of said first instruction to said second instruction register, and means controlled from one of said instruction registers to extract operands as required from the memory means and to initiate execution of said first instruction by said arithmetic means, said cycling means actuating said sequencing means and controlling the transfer of instructions between said instruction registers so that a further instruction is called from said memory while said first and second instructions are still undergoing processing.

32. A digital computer having data-processing means, control means for controlling the operation of said data-processing means according to an instruction and an addressable memory means for storing data comprising instructions and operands which memory means during a designated time period may or may not be accessible, said memory means including means responsive to the addressing thereof for indicating the availability of said memory means, said control means comprising a plurality of instruction registers coupled together and to said memory means for controlling the operation of said computer and storing a plurality of different instructions, each of said instruction registers controlling portions of said computer so that different steps in the processing of said plurality of instructions may be carried on simultaneously, sequencing means calling for the extraction of instructions from said memory means in a sequence for transfer to said instruction registers, and cycling means responsive to signals indicative of the accessibility of said memory means and effective to control the operation of said sequencing means and the transfer of instructions between said instruction registers wherein said cycling means is maintained in a predetermined condition by generation of a signal indicating accessibility of said memory means to cause said sequencing means each during each said designated time period to extract new instruction data from said memory means for transfer to said instruction registers.

33. A digital computer having a memory for storing instructions, control means including means for extracting information from the memory, first means for storing said instructions and for automatically performing first steps in the manipulation thereof, second means for storing said instructions and performing second steps in the manipulation thereof, means for transferring an instruction from said first means to said second means and means for transferring a further instruction to said first means after said first named instruction has been transferred to said second means and while said first named instruction is stored in said second means.

34. A data-processing machine adapted to process signals representative of instructions having means for storing said instructions, means for processing said instructions including a plurality of instruction registers for receiving at least two different instructions and control means responsive to contents of said registers for effecting the concurrent processing of said two different instructions, means for selecting and extracting instructions successively from said storage means for processing by said processing means, sensing means for determining if a certain condition exists during the processing of a first instruction, and means responsive to said sensing means for inhibiting the processing of a second instruction extracted subsequently to said first instruction and for causing a third instruction to be extracted and processed instead of said second instruction.

* * * * *

Disclaimer 3,629,853.—*John D. Newton*, Kingston, N.Y. DATA PROCESSING ELEMENT. Patent dated Dec. 21, 1971. Disclaimer filed Mar. 24, 1972, by the assignee, *International Business Machines Corporation.*

Hereby enters this disclaimer to claims 17, 21, 22, 25, 26, 28 and claim 1 of said patent.

[*Official Gazette July 18, 1972.*]

UNITED STATES PATENT OFFICE
CERTIFICATE OF CORRECTION

Patent No. 3,629,853 Dated December 21, 1971

Inventor(s) John D. Newton

It is certified that error appears in the above-identified patent and that said Letters Patent are hereby corrected as shown below:

Col. 3, line 63, after "desired" insert --data--;

Col. 5, line 29, after "to" insert --an--;

Col. 6, line 44, change "rests" to --resets--;

Col. 6, line 65, change "108" to --208--;

Col. 6, line 70, after "196." insert --Summarizing--;

Col. 7, line 70, "signals leave" should be --signal levels--;

Col. 8, line 26, "Filton" should be --Tilton--;

Col. 9, line 48, --10-- should be moved to left under the column headed "Bits S-1";

Col. 10, line 44, "$0005_8$)" should be --$00005_8$)--;

Col. 13, line 24, after "sought" insert -- -for --;

Col. 13, line 65 "120" should be --210--;

Col. 14, line 11, after "probable" insert --subsequent--;

Claim 14, line 64 "secondary" should be --second--;
Claim 18, line 49 "computer" should be --arithmetic means--; line 52, same correction;
Claim 21, line 25 after "thereto" insert --said control means--;
Claim 4, line 60, after "said" insert --two--;
Claim 32, line 5, after "means" delete "each"; after "during" delete "each".

Signed and sealed this 26th day of December 1972.

(SEAL)
Attest:

EDWARD M. FLETCHER,JR.
Attesting Officer

ROBERT GOTTSCHALK
Commissioner of Patents